United States Patent [19]

Hoffman

[11] Patent Number: 5,533,289
[45] Date of Patent: Jul. 9, 1996

[54] ILLUMINATED SIGN

[75] Inventor: Peter Hoffman, West Palm Beach, Fla.

[73] Assignee: I.D. Lite, Inc., West Palm Beach, Fla.

[21] Appl. No.: 223,408

[22] Filed: Apr. 4, 1994

Related U.S. Application Data

[60] Continuation-in-part of Ser. No. 996,425, Dec. 23, 1992, Pat. No. 5,367,806, which is a division of Ser. No. 868,931, Apr. 16, 1992, Pat. No. 5,339,550.

[51] Int. Cl.$^6$ .................................................. G09F 13/22
[52] U.S. Cl. ................................ 40/544; 40/591; 40/594
[58] Field of Search ........................... 40/544, 580, 591, 40/593, 594; 248/205.3, 467; 362/84

[56] References Cited

U.S. PATENT DOCUMENTS

| | | |
|---|---|---|
| 2,908,806 | 10/1959 | Cohen . |
| 2,922,912 | 1/1960 | Miller . |
| 3,012,164 | 12/1961 | Franzone et al. . |
| 3,037,137 | 5/1962 | Motson . |
| 3,069,509 | 12/1962 | Sherron . |
| 3,137,083 | 6/1964 | George et al. . |
| 3,226,272 | 12/1965 | Longfellow . |
| 3,316,435 | 4/1967 | Kelso . |
| 3,317,722 | 5/1967 | Whitney . |
| 3,404,474 | 10/1968 | Johnson . |
| 3,680,237 | 8/1972 | Finnerty, Sr. . |
| 4,020,389 | 4/1977 | Dickson et al. . |
| 4,066,925 | 1/1978 | Dickson . |
| 4,138,620 | 2/1979 | Dickson . |
| 4,443,832 | 4/1984 | Kanamori et al. . |
| 4,466,208 | 8/1984 | Logan, Jr. et al. . |
| 4,494,326 | 1/1985 | Kanamori . |
| 4,704,941 | 11/1987 | Reilly . |
| 4,955,153 | 9/1990 | Albrecht et al. . |
| 4,999,936 | 3/1991 | Calamia et al. ........................ 40/544 |
| 5,005,306 | 4/1991 | Kinstler . |

FOREIGN PATENT DOCUMENTS

| | | | |
|---|---|---|---|
| 2468173 | 5/1981 | France | ................................. 248/467 |
| 2230638 | 10/1990 | United Kingdom . | |

*Primary Examiner*—Brian K. Green

[57] ABSTRACT

An illuminated sign for application to a support surface includes a planar back panel, an electroluminescent lamp disposed over the back panel, and a transparent front panel disposed over a side of the lamp opposite the back panel with the back and front panels being secured together in alignment to form a laminate encapsulating the lamp. Indicia defined by an illuminated portion of the lamp visible through the front panel is formed by an indicia defining member that can be separate from or part of the laminate. A fixation surface having adhesive properties is disposed along a forward surface of the sign for adhesively securing the sign to the support surface by contact with the fixation surface. A power supply for the sign includes a housing for receiving a conductor of the lamp with the housing being flush with a peripheral edge of the laminate.

6 Claims, 2 Drawing Sheets

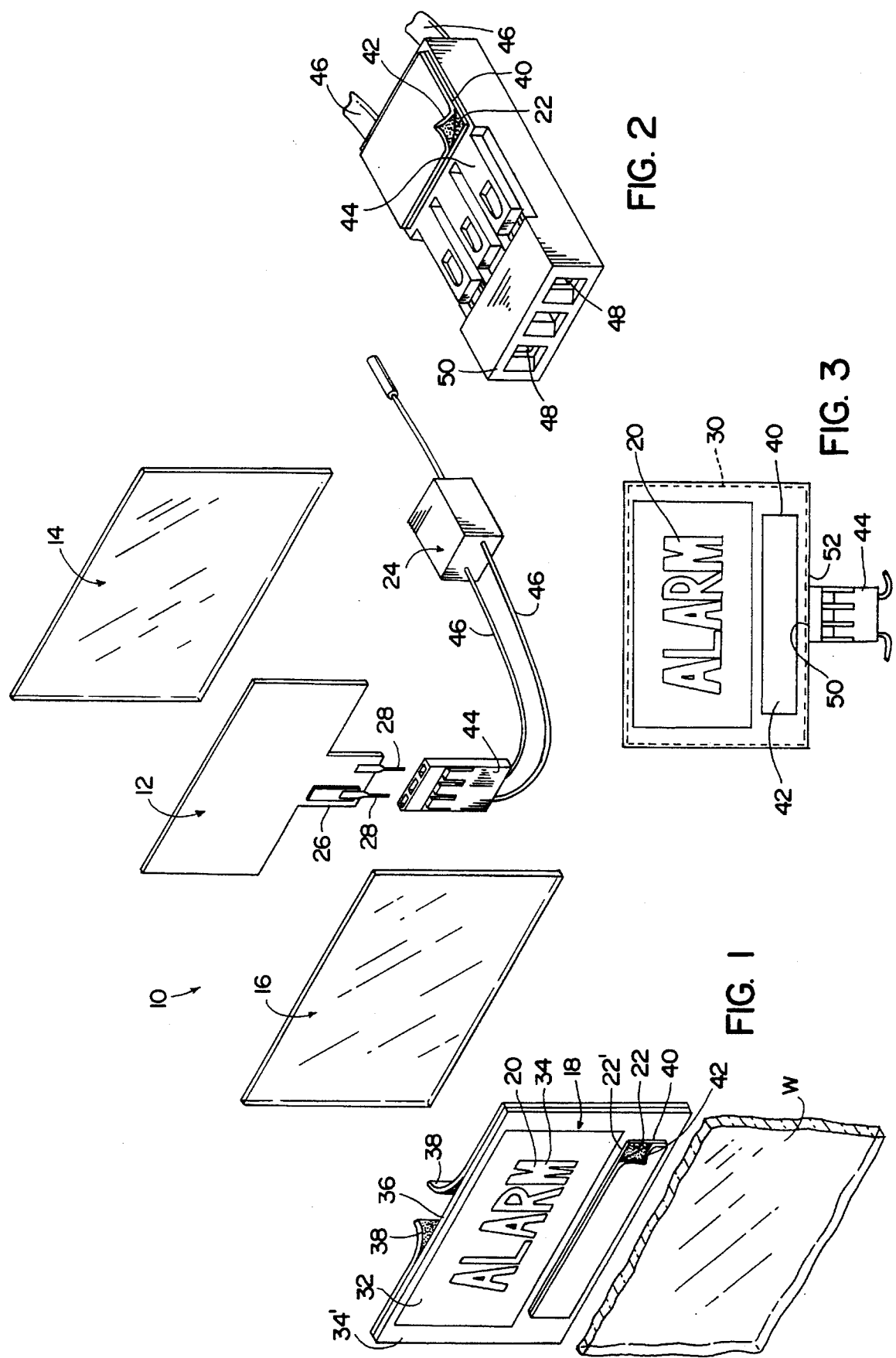

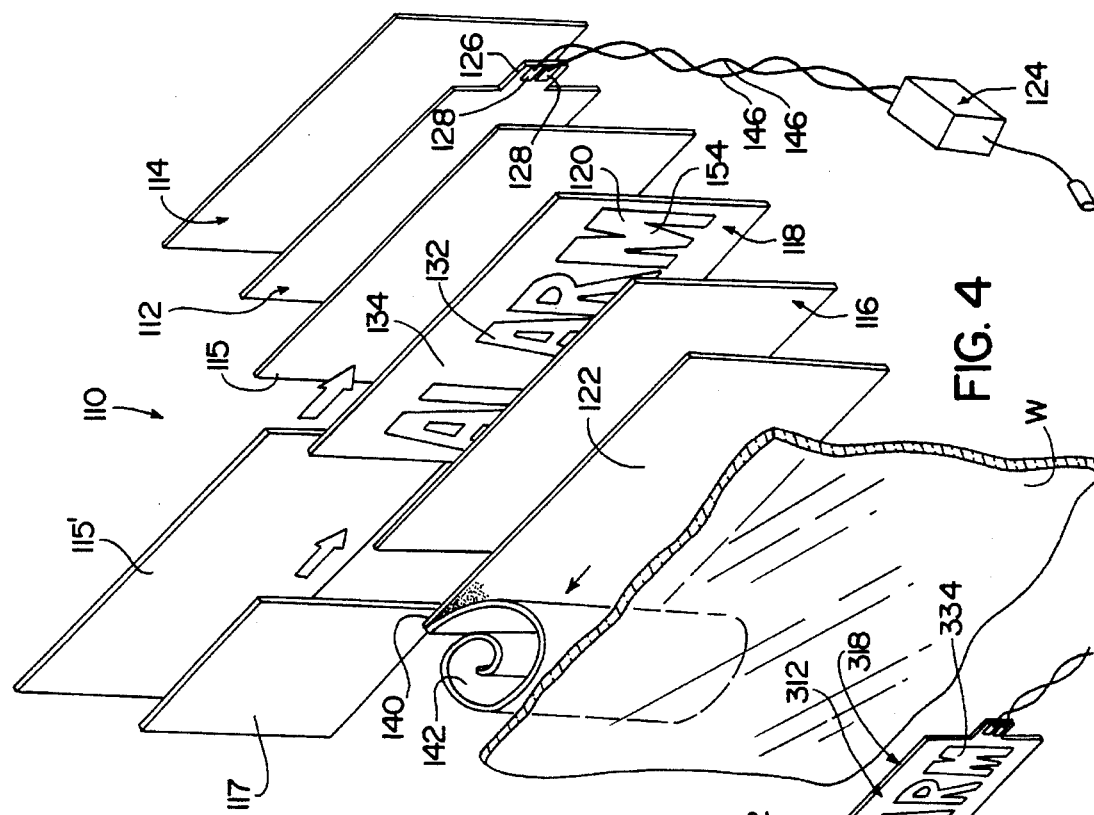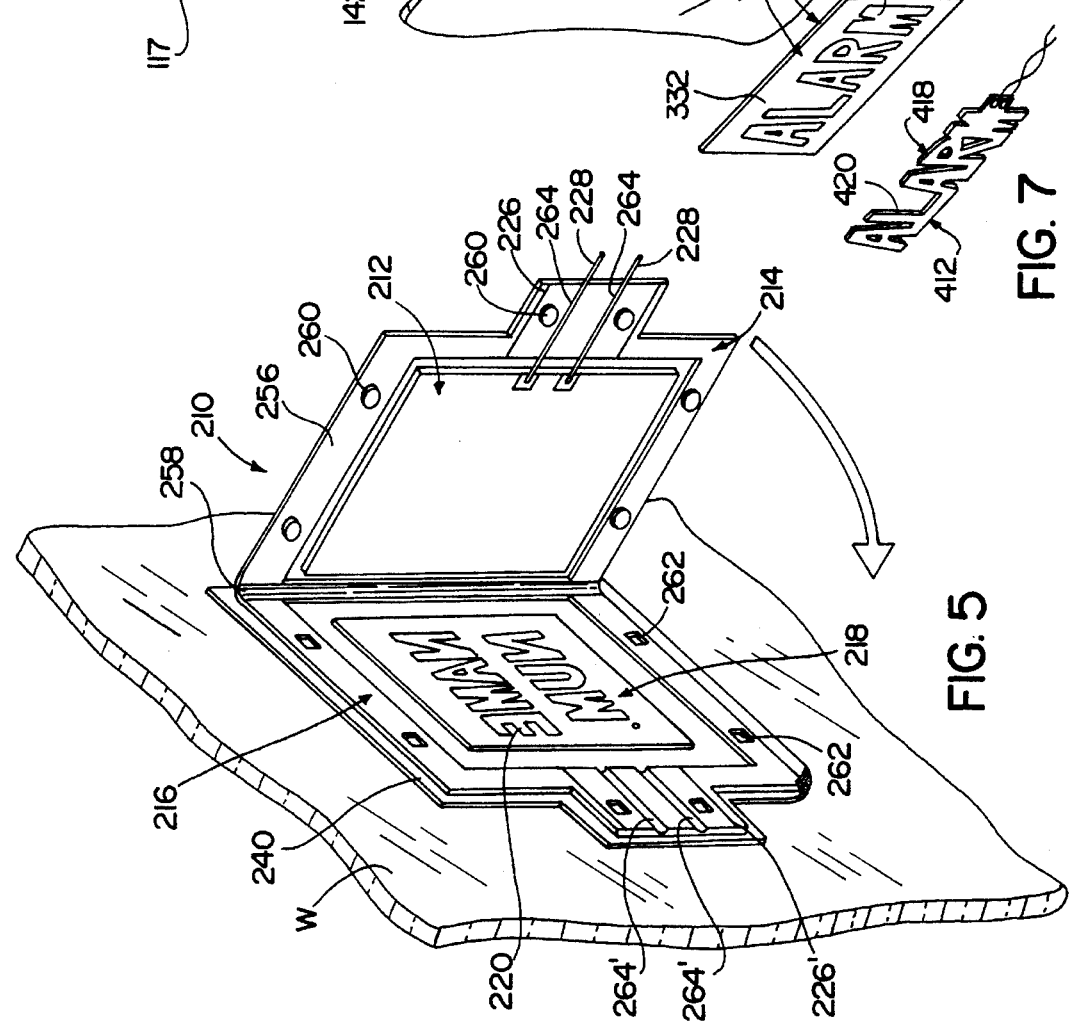

ILLUMINATED SIGN

CROSS-REFERENCE TO RELATED PATENT APPLICATIONS

This application is a continuation-in-part of U.S. patent application Ser. No. 07/996,425 filed Dec. 23, 1992, now U.S. Pat. No. 5,376,806, which is a divisional of Ser. No. 07/868,931, filed Apr. 16, 1992, now U.S. Pat. No. 5,339,550, the disclosures of which are incorporated herein by reference.

BACKGROUND OF THE INVENTION

1. Field of the Invention

The present invention relates to illuminated signs and, in particular, to low cost, readily manufacturable, easily assembled illuminated signs for convenient mounting on panes or sheets of transparent material such as windows.

2. Discussion of the Prior Art

Illuminated signs employing flat panel electroluminescent lamps typically include a flat layer of phosphor material and two electrodes such that, when coupled with an appropriate power supply, the lamps provide flat, lighted panels of low cost and high efficiency. Neat and attractive lighted signs using electroluminescent lamps can be made by covering luminous surfaces of the lamps with indicia bearing members, such as sheets of opaque plastic material having portions thereof cut out to define indicia, such that the luminous surfaces of the lamps are visible through the cut-outs or indicia.

U.S. Pat. Nos. 5,005,306 to Kinstler, 4,494,326 and 4,443,832 to Kanamori, 4,138,620 to Dickson, 3,680,237 to Finnerty and 2,922,912 to Miller and Great Britain patent 2,230,638A are illustrative of illuminated signs formed of electroluminescent lamps or panels and overlying indicia bearing members for external application to motor vehicles and for use as illuminated house numbers, for example. Some of the disadvantages of presently available illuminated signs having electroluminescent lamps and indicia bearing members are that the signs are relatively expensive to manufacture and assemble, include an excessive number of components and are not easily mountable on support surfaces, especially transparent, flat support surfaces such as windows.

SUMMARY OF THE INVENTION

Accordingly, it is a primary object of the present invention to overcome the aforementioned disadvantages of prior art illuminated signs.

Another object of the present invention is to provide simplified structure for an illuminated sign.

A further object of the present invention is to provide an illuminated sign having an electroluminescent lamp encapsulated between front and back panels bonded together to form a laminate and having indicia defined by visible and non-visible sections of the lamp.

Yet another object of the present invention is to provide a forward surface of an illuminated sign with adhesive properties for use in securing the sign to a support surface.

Yet a further object of the present invention is to mount an insulative housing for conductors of an electroluminescent lamp on a sign such that the sign and the housing are flush.

Some of the advantages of the present invention are that the lamps are encapsulated between the front and back panels and thereby protected, the indicia defining members can similarly be protected via encapsulation, ornamental effect and/or clarity can be enhanced through use of a contrast layer, the indicia defining members and/or lamps can be designed to be easily changed or replaced, conductive parts are not exposed such that undesired electrical discharge or shocks are avoided, the illuminated signs can be manufactured utilizing known lamination techniques for simplicity and cost effectiveness, and the illuminated signs are particularly advantageous for use as highly visible alarm indicators or warning devices, for use in place of many conventional neon signs and for use by day or night.

These and other objects, advantages and benefits are realized with the present invention as characterized in an illuminated sign including a planar electroluminescent lamp encapsulated between a back panel and a front panel secured to one another to form a laminate with at least a portion of the lamp being visible through the front panel. An indicia defining member separate from or integral with the lamp defines indicia formed by visible and non-visible portions of the lamp. The back and front panels can be formed as separate members or integrally, unitarily as a single laminate defining member. The indicia defining member can be encapsulated between the front and back panels or the indicia defining member can be a separate member applied to the laminate. The indicia defining member and/or lamp can be designed as removable or replaceable components for interchangeability. One or more contrast layers or sheets of translucent colored or contrast material can be disposed over at least part of the visible portion of the lamp for enhanced visual effect. A power supply for supplying power to the lamp includes a housing for mounting conductors of the lamp such that the housing is flush with the sign and no conductive parts are exposed.

Other objects and advantages of the present invention will become apparent from the following description of the preferred embodiment taken in conjunction with the accompanying drawings wherein like parts in each of the several figures are identified by the same reference characters.

DESCRIPTION OF THE DRAWINGS

FIG. 1 is an exploded perspective view of an illuminated sign according to the present invention illustrating application of the illuminated sign to a window.

FIG. 2 is a perspective view of an electrical housing of the power supply for the illuminated sign of FIG. 1.

FIG. 3 is a front plan view of the illuminated sign of FIG. 1 assembled to the electrical housing of FIG. 2.

FIG. 4 is an exploded perspective view of another embodiment of an illuminated sign according to the present invention.

FIG. 5 is a perspective view of an additional embodiment of an illuminated sign according to the present invention.

FIG. 6 is a perspective view of a modification of an indicia defining member for use in the illuminated signs according to the present invention.

FIG. 7 is a perspective view of a further modification of the electroluminescent lamp for use in the illuminated signs according to the present invention.

DESCRIPTION OF THE PREFERRED EMBODIMENTS

An illuminated sign 10 according to the present invention is illustrated in FIG. 1 and includes a flat panel or planar electroluminescent lamp 12 disposed between a flat or planar back panel 14 and a flat or planar transparent front panel 16, an indicia bearing or defining member 18 defining indicia 20, an adhesive fixation surface 22 for securing the sign 10 to a support surface and a power supply 24 for supplying power to illuminate lamp 12. Various types of flat panel electroluminescent lamps can be utilized for lamp 12, one preferred electroluminescent lamp being the Durel 3 lamp of Durel Corporation of Tempe, Ariz. Lamp 12 can have any desired external or peripheral configuration, the lamp 12 of FIG. 1 having a generally rectangular configured section with a terminal tab 26 protruding from a bottom or lower edge of the rectangular section. Terminal tab 26 can have various peripheral configurations including square or rectangular peripheral configurations as shown in FIG. 1 to mount one or more electrical leads, contacts or conductors 28 of lamp 12, for stress-relief and for strengthening the connection between conductors 28 and lamp 12. As shown in FIG. 1, conductors 28 include a pair of male contacts or posts 28 electrically connected with lamp 12. Preferably, lamp 12 is made of a flexible material to flex or bend to conform to non-planar support surfaces to which sign 10 is to be applied.

Back panel 14 and front panel 16 are preferably made of a thin sheet of transparent, durable laminate material, such as clear polyvinyl chloride (PVC) or other plastic, to strengthen the illuminated sign 10 and to render it more durable. Preferably, the back and front panels 14 and 16 are flexible for application to non-planar support surfaces. The back panel 14 and the front panel 16 are secured or bonded to one another along a seal to form a laminate with the lamp 12 encapsulated or sandwiched between the back panel 14 and the front panel 16. The back panel 14 and the front panel 16 are preferably sealed along or just inwardly of the peripheral edges thereof; however, the seal securing the back and front panels to one another can have various locations in accordance with the size and configuration of the back and front panels and of lamp 12. As shown in FIG. 3, the back and front panels 14 and 16 for sign 10 are bonded to one another along a seal 30, shown in dotted lines, extending continuously along the peripheries of the back and front panels. The back panel 14 and the front panel 16 can be secured or bonded to one another in many various ways, such as with adhesive bonding or heat sealing, to encapsulate and protect the electroluminescent lamp 12. Back panel 14 and front panel 16 can have any desired external or peripheral size or configuration to cover lamp 12 including tab 26, and the external sizes or configurations of the back panel 14 and the front panel 16 can be the same or different. As shown in FIG. 1, the back panel 14 and the front panel 16 are coextensive in peripheral extent, and the peripheral configuration and size of the back panel 14 and the front panel 16 is greater in extent than the peripheral size of lamp 12 to cover lamp 12 in its entirety. Accordingly, with the lamp 12 encapsulated between the back panel 14 and the front panel 16, the periphery of lamp 12 including tab 26 is disposed along or inwardly of seal 30. With the back panel 14 sealed to the front panel 16, no parts of lamp 12 are exposed and only the posts 28 protrude beyond the peripheral edge of the laminate formed by the assembly of lamp 12, back panel 14 and front panel 16.

Indicia defining member 18 defines indicia 20, such as letters, numbers, a pattern, design or symbols for conveying a message and/or for ornamentation, the indicia 20 being formed at least in part by one or more illuminated portions of lamp 12 visible through front panel 16. The indicia defining member 18 and indicia 20 defined thereby can be made in many various ways. For example, indicia defining member 18 can include a panel, sheet, layer, piece or strip of material, such as vinyl or plastic, made of transparent and non-transparent or opaque portions arranged to define indicia 20 with illuminated portions of lamp 12 being visible through the transparent portions and/or the front panel 16. Another way to form indicia defining member 18 is as a sheet, panel, layer, piece or strip of transparent material, such as clear vinyl or plastic, having non-transparent or opaque portions printed or silk-screened thereon. Still another way to form indicia defining member 18 is as a sheet, panel, layer, piece or strip of opaque material, such as vinyl or plastic, having portions thereof cut out to define indicia 20 such that the cut-outs form the transparent portions of the indicia defining member. The indicia defining member 18 can also be formed as one or more nontransparent or opaque pieces of sheet material configured as indicia 20 such that sections of the lamp 12 around the non-transparent indicia are visible and thusly define the transparent portions. If desired, the indicia defining member 18 and indicia 20 defined thereby can also be made integrally, unitarily with lamp 12 or front panel 16 thusly eliminating the need for a separate indicia defining member. The indicia defining member 18 and/or lamp 12 can be designed for replacement or interchangeability with various lamps and indicia defining members as explained further below. The indicia defining member 18 can have portions thereof of different and/or contrasting colors, or the sign 10 can further include one or more contrast layers of translucent colored or contrast material as will be explained further below.

As shown in FIG. 1, indicia defining member 18 is made as a sheet of material having a transparent portion 32 and non-transparent portions 34 and 34'. The non-transparent portion 34 defines indicia 20 corresponding to the word "ALARM" located centrally along the transparent portion 32, which is rectangular in configuration. The non-transparent portion 34' defines indicia 20' corresponding to a contrast frame or border around transparent portion 32. Indicia defining member 18 for sign 10 has an adhesive backing or layer 36 covered by one or more release sheets 38 that are manually removable from backing 36 to expose the adhesive backing 36 to allow the indicia defining member 18 to be applied to a component of sign 10, the indicia defining member 18 for sign 10 being applied to front panel 16. Depending on the adhesive strength of backing 36, the indicia defining member 18 can be removably attached to front panel 16 or to another component of sign 10 for removal and replacement permitting interchangeability of various indicia defining members. It should be appreciated that the indicia defining member 18 and indicia 20 can be formed or made in many various ways in addition to those described herein and that the specifically described indicia defining members should be considered illustrative.

Fixation surface 22 for sign 10 includes a fixation layer or piece 40 of material, such as double-sided adhesive tape, having adhesive along opposing sides thereof with one of the adhesive sides forming fixation surface 22. Fixation layer 40 can be transparent or non-transparent, the fixation layer 40 for sign 10 being the same color as non-transparent portion 34'. Fixation layer 40 has adhesive along opposing sides or surfaces 22 and 22' thereof, and the sign 10 can be supplied with or without one of the adhesive sides 22 or 22' affixed or attached to a front or forward face or surface of sign 10. As shown in FIG. 1, sign 10 has adhesive side 22' adhesively attached to a forward surface thereof, such as a forward surface of front panel 16. A removable cover or release sheet 42 is disposed over the adhesive side, i.e. side 22 in FIG. 1, not attached to the laminate for removal from the fixation layer 40 to expose the adhesive side for securement of the sign to a support surface. Where the fixation layer 40 is supplied separately and not attached to the sign or laminate, cover or release sheets are provided over both the adhesive sides 22 and 22'. Fixation layer 40 has a size and configuration suitable to provide a solid bond with the front face of sign 10 and with the support surface, and the fixation layer 40 can be applied to the laminate as shown in FIG. 1 or to the power supply housing 44 as shown in FIG. 2. Where the fixation layer 40 is applied to the laminate, the fixation layer 40 can have an area greater than, coextensive with or smaller than the area of the front face of the laminate. As shown in FIGS. 1 and 3 the area of fixation layer 40 is less than the area of the laminate front face, the fixation layer 40 being a narrow strip of material disposed along a lower or bottom edge of indicia defining member 18. Various materials or double-sided adhesive tape can be utilized for fixation layer 40, one preferred material being the double-sided adhesive tape sold by Morgan Adhesive Co. of Stow, Ohio as Part No. IB-2107.

Power supply 24 includes a source of power for lighting, illuminating or electrifying lamp 12. Power supply 24 can be designed in many various ways to supply power to electrify lamp 12 and can include a self-contained DC to AC converter unit including a battery and an inverter for supplying power to lamp 12 or the power supply can be designed with an adapter for connection to a source of electric power, such as a cigarette lighter socket of an automobile. Power supply 24 includes an insulative electrical housing 44 connected with power supply leads 46. Housing 44 can be designed in many ways to mount posts 28 to electrically couple lamp 12 with power supply 24. As shown in FIG. 2, housing 44 is in the nature of a female receptacle having recesses 48 for receiving posts 28 therein in communication with contacts disposed in the housing 44. It should be appreciated that power supply 24 can be supplied with direct or alternating current from any source dependent on where the illuminated sign 10 is used, such as on or in buildings or automobiles, for example. A flasher mechanism (not shown) can be incorporated in power supply 24 for controlled intermittent or flashing illumination of lamp 12.

According to a method of assembly or manufacture of the illuminated sign 10, lamp 12 is assembled between back panel 14 and front panel 16, which are aligned or juxtaposed, and the back and front panels 14 and 16 are sealed, secured or bonded to one another along their peripheries to form a laminate and to encapsulate lamp 12 therebetween. Release sheets 38 are manually peeled away from indicia defining member 18 to expose adhesive backing 36, and the indicia defining member 18 is assembled to the front panel 16 by applying or pressing the exposed adhesive backing 36 to the forward surface or face of front panel 16. Where fixation layer 40 is not already applied to indicia defining member 18, one of the release sheets of the fixation layer 40 is manually peeled away to expose the adhesive along one of the sides 22 or 22'. The fixation layer 40 is then applied to indicia defining member 18 such as by pressing the exposed adhesive side 22' against the forward surface of indicia defining member 18. Posts 28 are inserted in recesses 48 of housing 44 to electrically couple lamp 12 with power supply 24. With lamp 12 coupled with housing 44, as shown in FIG. 3, the housing 44 is flush with the laminate or sign in that an upper edge 50 of the housing contacts a peripheral edge 52 of the laminate such that no electrically conductive parts, such as posts 28, are exposed thusly avoiding undesired electrical discharge and shock.

When it is desired to apply sign 10 to a support surface, such as a window W of an automobile, release sheet 42 of fixation layer 40 is manually peeled away to expose adhesive surface 22, which is pressed against or applied to surface W to removably affix the sign 10 to the support surface W. Power supply 24 is utilized to supply power to illuminate lamp 12, such illumination being visible through the transparent portion 32 of indicia defining member 18. The illumination visible through transparent portion 32 creates a distinct contrast with the non-transparent portions 34 and 34' such that the indicia 20 and 20' are clearly visible.

Another embodiment of an illuminated sign according to the present invention is illustrated at 110 in FIG. 4. Illuminated sign 110 is similar to illuminated sign 10 except that indicia defining member 118 for illuminated sign 110 is encapsulated between back panel 14 and front panel 116 of sign 110. Illuminated sign 110 includes lamp 112 and indicia defining member 118 disposed between back panel 114 and front panel 116, the back and front panels being secured, bonded or sealed to one another along their peripheries during assembly to encapsulate lamp 112 and indicia defining member 118 therebetween. Lamp 112 is similar to lamp 12 except that terminal tab 126 for lamp 112 protrudes from a lateral or side edge of the rectangular section of lamp 112. Indicia defining member 118 is made as a sheet of opaque material having a cut-out 154 defining indicia 120 corresponding to the word "ALARM". Accordingly, the opaque sheet material of the indicia defining member 118 defines non-transparent portion 134, and the cut-out 154 defines transparent portion 132 through which lamp 112 is visible. Back panel 114 and front panel 116 are similar to back and front panels 14 and 16. The back panel 114 and the front panel 116 are larger in peripheral extent than the peripheral extent of lamp 112 such that the periphery of lamp 112 including tab 126 is disposed along or within the lamination seal of the back and front panels 114 and 116. Depending on the material of indicia defining member 118, the indicia defining member 118 can be smaller in peripheral extent than the peripheral extent of the back and front panels 114 and 116 to be disposed inwardly of the seal, or the indicia defining member 118 can have the same or substantially the same peripheral extent as the back and front panels 114 and 116 such that the peripheral edge of the indicia defining member 118 is disposed along or within the seal. Fixation layer 140 for sign 110 includes release sheet 142 and is similar to fixation layer 40 except that fixation layer 140 is coextensive in area with a forward surface of front panel 116. Power supply 124 for sign 110 is similar to power supply 24 except that leads 146 of power supply 124 are connected with conductors 128 of lamp 112, which are in the nature of contacts, on tab 126. The conductors 128 do not protrude beyond tab 126 and no housing is provided with power supply 124.

If desired, an intermediate panel 115 can be provided between lamp 112 and indicia defining member 118 and the lamp 112 can be encapsulated between back panel 114 and intermediate panel 115 with indicia defining member 118 encapsulated between intermediate panel 115 and front panel 116. However, it should be appreciated that intermediate panel 115 need not be provided and that the lamp 112 and the indicia defining member 118 can be assembled adjacent one another for encapsulation together between back panel 114 and front panel 116. Where provided, intermediate panel 115 can be made of the same or similar material as back panel 114 and front panel 116. Intermediate panel 115 has a size and configuration to be sealed or bonded to back panel 114 and front panel 116 along the peripheral edges thereof to form a laminate. If desired, a second intermediate panel 115' can be provided between the intermediate panel 115 and the indicia defining member 118 allowing the lamp assembly corresponding to the laminate of lamp 112, back panel 114 and intermediate panel 115 to be made separately from an indicia assembly corresponding to a laminate of indicia defining member 118, front panel 116 and intermediate panel 115'. The indicia assembly can be made separately from the lamp assembly by bonding or securing the second intermediate panel 115' to front panel 116 to encapsulate indicia defining member 118, and separately bonding panel 115 to back panel 114 to encapsulate lamp 112. The indicia assembly and the lamp assembly can be assembled together with the use of any suitable permanent or releasable means including adhesives. Where the indicia defining member and the lamp are formed as separate laminate assemblies, the indicia assembly and/or the lamp assembly can be easily changed or replaced. It should be appreciated that one or both of the lamp assembly and the indicia assembly can be assembled in various other ways in addition to the lamination processes described herein.

A method of assembly for sign 110 is similar to that previously described except that both the lamp 112 and the indicia defining member 118 are encapsulated between back panel 114 and front panel 116. Where intermediate panel 115 is provided, lamp 112 is disposed between back panel 114 and intermediate panel 115, indicia defining member 118 is disposed between intermediate panel 115 and front panel 116, and the back, intermediate and front panels 114, 115 and 116 are secured, bonded or sealed to one another, preferably along the peripheral edges thereof. It should be appreciated that the lamination process for sign 110 can be a two-step process in that back panel 114 and intermediate panel 115 can be secured together to encapsulate lamp 112 and thereafter front panel 116 can be secured to intermediate panel 115 to encapsulate indicia defining member 118. Where intermediate panel 115' is also provided, the lamination process can include one or two steps depending on whether the lamp and indicia defining member are to be made as separate assemblies. Where separate lamp and indicia assemblies are desired, back panel 114 is bonded to intermediate panel 115 to encapsulate lamp 112 and, in a separate procedure, front panel 116 is bonded to intermediate panel 115' to encapsulate indicia defining member 118. Sign 110 can be supplied with fixation layer 140 already applied to the laminate, or the fixation layer 140 can be applied by the user prior to use. When it is desired to affix sign 110 to a support surface, such as window W, release sheet 142 is removed from fixation layer 140 to expose adhesive surface 122 allowing surface 122 to be adhesively secured to surface W. Power supply 124 is utilized to supply power to illuminate lamp 112 such that indicia 120 is visible through front panel 116.

As also shown in FIG. 4, a contrast layer, strip, piece or panel 117 of colored or contrasting translucent material can be disposed over the visible sections of lamp 112 to provide color and/or contrast. Contrast layer 117 can be arranged over the visible sections of lamp 112 in many various ways, such as by being interposed between front panel 116 and the indicia defining member 118. Contrast layer 117 has a size and peripheral configuration to be arranged over the lamp 112 to cover a desired part or parts of the transparent portion 132. As shown in FIG. 4, contrast layer 117 has a peripheral size or area to cover approximately one-half of the transparent portion 130. Accordingly, the contrast layer 117 will cover the first two letters of the word "ALARM" in their entireties and one-half of the third letter to provide a different color or contrast. Contrast layer 117 can be a separate member or the contrast layer 117 can be encapsulated in the sign 110 in many various ways in accordance with the location of the contrast layer 117 and the manner in which the contrast layer 117 is arranged in the sign 110. For example, the contrast layer 117 can be encapsulated with the indicia defining member 118 between front panel 116 and/or intermediate panels 115 or 115' as shown.

A further embodiment of an illuminated sign according to the present invention is illustrated in FIG. 5 at 210. Illuminated sign 210 is similar to illuminated sign 110 except that the back panel 214 and the front panel 216 of illuminated sign 210 are made integrally, unitarily as a single laminate defining member 256 encapsulating lamp 212 and indicia defining member 218. Laminate defining member 256 includes a layer, strip, panel, sheet or piece of laminate material bent or folded along a hinge or fold line 258 to define a back panel portion corresponding to back panel 214 and a front panel portion corresponding to front panel 216. Protrusions or pins 260 can be provided on one panel portion, i.e. back panel 214 in FIG. 5, located slightly inwardly of the peripheral edge of the back panel 214. Recesses 262 can be provided on the other panel portion, i.e. front panel portion 216, at locations corresponding to the locations of protrusions 260. Protrusions 260 have a size and configuration to be matingly, frictionally engaged in recesses 262 to maintain the laminate defining member 256 in a folded condition with the back panel 214 overlying the front panel 216 in alignment therewith when the laminate defining member 256 is bent, folded or pivoted along fold line 258 as shown by the arrow in FIG. 5. The lamp 212 and the indicia defining member 218 are somewhat smaller in area and peripheral size than the back and front panels 214 and 216 such that, when lamp 212 and indicia defining member 218 are placed therebetween, the peripheral edges of the back and front panels 214 and 216 can be aligned or juxtaposed causing the protrusions 260 to be received in recesses 262. Tab portions 226 and 226' protrude from back panel 214 and front panel 216, respectively, for being aligned or juxtaposed with one another in mating engagement when the laminate defining member 256 is folded or bent along fold line 258. Tab portions 226 and 226' have recesses 264 and 264' therein for receiving and supporting posts 228 connected to lamp 212 for coupling lamp 212 with a power supply (not shown).

According to a method of assembly or manufacture for illuminated sign 210, the laminate defining member 256 is folded, bent or pivoted along fold line 258, and the lamp 212 and the indicia defining member 218 are positioned between the back panel 214 and the front panel 216. With the lamp 212 and the indicia defining member 218 disposed between the back panel 214 and the front panel 216, the laminate defining member 256 is folded further to position the back panel 214 in juxtaposition or alignment with the front panel 216 causing protrusions 260 to enter recesses 262. The peripheral edges of back panel 214 and front panel 216 are secured, bonded or sealed together to form a laminate with lamp 212 and indicia defining member 218 encapsulated between the back and front panels 214 and 216. A fixation layer 240 adhesively secured to a forward surface of front panel 216 is utilized to affix sign 212 to a support surface W such as a window with indicia 220 being visible through front panel 216.

A modification of an indicia defining member for use with the illuminated signs according to the present invention is illustrated at 318 in FIG. 6. Indicia defining member 318 is made integral with lamp 312 by applying non-transparent or opaque portions 334 directly on lamp 312 such as by silk screening, printing or painting the non-transparent portions 334 thereon. Accordingly, the lamp 312 will be visible around the non-transparent portions 334 and the visible sections of the lamp will define a transparent portion 332. In a similar manner, the indicia defining member can be made integral with a front panel of the illuminated signs by applying opaque material thereto.

A modification of an electroluminescent lamp for use with the illuminated signs of the present invention is illustrated at 412 in FIG. 7. Lamp 412 is formed, shaped or configured to correspond to the shape, formation or configuration of indicia 420 such that the indicia defining member 418 is formed by the lamp itself.

With the present invention, illuminated signs can be manufactured utilizing known manufacturing techniques for simplicity and cost reduction, the electroluminescent lamps and/or indicia defining members of the signs are encapsulated to be unexposed and protected, contrast layers or materials can be easily incorporated in the illuminated signs for enhanced visual effect, the electrical housing is completely flush with the illuminated signs such that no conductive parts are exposed, the indicia defining members can be made integrally, unitarily with the electroluminescent lamps or other components for a reduction in parts and ease of manufacture, the illuminated signs can be made with replaceable and/or interchangeable components, the panels of the illuminated signs can be made integrally, unitarily for additional simplicity, ease of assembly and manufacture, and the illuminated signs can be easily applied by a user to a support surface including non-planar or curving support surfaces such as automobile windows.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. An illuminate sign for being mounted to a support surface comprising a substantially planar back panel;

a substantially planar electroluminescent lamp disposed over said back panel;

a substantially planar, transparent disposed over said lamp in alignment with said back panel;

indicia defined by illuminated sections of said lamp visible through said front panel, said back panel, said lamp, said front panel and said indicia together forming a sign assembly having a peripheral edge;

an electrical conductor connected with said lamp and protruding beyond said peripheral edge;

a power supply for supplying power to illuminate said lamp and including a housing for mounting said conductor to electrically couple said lamp to a source of power, said housing being flush and in abutment with said peripheral edge;

a fixation surface on said having adhesive properties for securing said sign to a support surface.

2. An illuminated sign as recited in claim 1 wherein said conductor includes a pair of posts and said housing includes recesses for receiving said posts.

3. An illuminated sign as recited in claim 2 wherein said fixation surface is disposed on said housing.

4. An illuminated sign as recited in claim 3 wherein said fixation surface includes an adhesive side of a piece of double-sided adhesive tape having an opposing adhesive side secured to said housing.

5. An illuminated sign as recited in claim 1 wherein said lamp includes a protruding tab and said conductor extends along said tab.

6. An illuminated sign as recited in claim 5 wherein said back panel and said front panel are bonded together along a seal to form a laminate and said lamp including said tab is encapsulated in its entirety between said back and front panels.

* * * * *